(12) United States Patent
Allard et al.

(10) Patent No.: US 10,563,905 B1
(45) Date of Patent: Feb. 18, 2020

(54) FERROMAGNETIC COVER FOR A TRIM BREAKER OF AN APPLIANCE CABINET

(71) Applicant: WHIRLPOOL CORPORATION, Benton Harbor, MI (US)

(72) Inventors: Paul B. Allard, Coloma, MI (US); Lynne F. Hunter, Dorr, MI (US); Daniel Lottinville, Stevensville, MI (US); Giulia Marinello, Park Ridge, IL (US); Dustin M. Miller, South Bend, IN (US); Sanjesh Kumar Pathak, Stevensville, MI (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 16/130,264

(22) Filed: Sep. 13, 2018

(51) Int. Cl.
  *A47B 96/04* (2006.01)
  *F25D 23/08* (2006.01)
  *F25D 23/02* (2006.01)

(52) U.S. Cl.
  CPC ......... *F25D 23/085* (2013.01); *F25D 23/028* (2013.01); *F25D 23/087* (2013.01)

(58) Field of Classification Search
  CPC .............................. F25D 23/082; F25D 23/085
  See application file for complete search history.

(56) References Cited

U.S. PATENT DOCUMENTS

| | | | |
|---|---|---|---|
| 3,338,451 A * | 8/1967 | Kesling | F25D 23/082 220/592.08 |
| 3,353,301 A | 11/1967 | Heilweil et al. | |
| 3,353,321 A | 11/1967 | Heilweil | |
| 4,330,310 A * | 5/1982 | Tate, Jr. | F25D 21/04 312/407 |
| 4,884,415 A * | 12/1989 | Mandel | F25D 21/04 62/277 |
| 5,255,531 A * | 10/1993 | Williams | F25D 23/028 312/406 |
| 6,266,970 B1 | 7/2001 | Nam et al. | |
| 6,428,130 B1 | 8/2002 | Banicevic et al. | |
| 6,655,766 B2 | 12/2003 | Hodges | |
| 9,188,382 B2 | 11/2015 | Kim et al. | |
| 2015/0135761 A1* | 5/2015 | Jang | F25D 21/04 62/441 |
| 2017/0299254 A1 | 10/2017 | Kim et al. | |
| 2018/0146798 A1* | 5/2018 | Artwohl | A47F 3/0434 |

* cited by examiner

*Primary Examiner* — Matthew W Ing
(74) *Attorney, Agent, or Firm* — Price Heneveld LLP

(57) ABSTRACT

A refrigerating appliance includes a cabinet having an inner liner, an outer wrapper and a plastic trim breaker extending therebetween. A door panel is operable relative to the cabinet between open and closed positions. The door panel has a seal that magnetically engages a contact surface of the cabinet to define the closed position of the door panel. A ferromagnetic plate extends over a portion of the plastic trim breaker to define the contact surface. A heat loop is disposed between the trim breaker and the ferromagnetic plate, in thermal communication with the contact surface. The heat loop extends from the trim breaker to a machine compartment of the cabinet. The ferromagnetic plate includes a looped edge that defines a heating chase. The heat loop is positioned within the heating chase and extends to the machine compartment.

16 Claims, 7 Drawing Sheets

FERROMAGNETIC COVER FOR A TRIM BREAKER OF AN APPLIANCE CABINET

FIELD OF THE DEVICE

The device is in the field of appliance cabinets, and more specifically, an appliance cabinet including a plastic trim breaker that includes a ferromagnetic cover for receiving a magnetic seal of a door panel.

SUMMARY

In at least one aspect, a refrigerating appliance includes a cabinet having an inner liner, an outer wrapper and a plastic trim breaker extending therebetween. The cabinet defines a machine compartment. A door panel is selectively operable relative to the cabinet between open and closed positions. The door panel has a magnetic seal that magnetically engages a contact surface of the cabinet to selectively define the closed position of the door panel. A ferromagnetic plate extends over a portion of the plastic trim breaker to define the contact surface. A heat loop is disposed between the trim breaker and the ferromagnetic plate and is in thermal communication with the contact surface. The heat loop extends from the trim breaker to the machine compartment. The ferromagnetic plate includes a looped edge that defines a heating chase. The heat loop is positioned within the heating chase defined by the looped edge. A portion of the heat loop extends from the heating chase to the machine compartment.

In at least another aspect, a refrigerating appliance includes a cabinet having an inner liner, an outer wrapper and a plastic trim breaker extending therebetween. The cabinet defines a machine compartment. A door panel is selectively operable relative to the cabinet between open and closed positions. The closed position is defined by a seal of the door panel engaging a contact surface of the cabinet, the seal having a magnetic member disposed within the seal. A ferromagnetic plate extends over a portion of the plastic trim breaker to define the contact surface. The magnetic member magnetically engages the ferromagnetic plate to selectively retain the seal against the contact surface to define the closed position. A heat loop is disposed between the trim breaker and the ferromagnetic plate and is in thermal communication with the contact surface. The heat loop extends from the trim breaker to the machine compartment.

In at least another aspect, a refrigerating appliance includes an inner liner and an outer wrapper. A plastic trim breaker extends between the inner liner and the outer wrapper and defines a contact surface. A door panel has a magnetic seal. The door panel is selectively operable relative to the contact surface between open and closed positions. The closed position is defined by the magnetic seal of the door panel selectively engaging the contact surface. A ferromagnetic plate extends over a portion of the plastic trim breaker to define the contact surface. The magnetic seal magnetically engages the ferromagnetic plate to selectively retain the seal against the contact surface to define the closed position. A heat loop is disposed between the trim breaker and the ferromagnetic plate and is in thermal communication with the contact surface. The heat loop extends from the trim breaker to the machine compartment. The ferromagnetic plate includes a looped edge that at least partially defines a heated chase. A portion of the heat loop is disposed within the heated chase.

These and other features, advantages, and objects of the present device will be further understood and appreciated by those skilled in the art upon studying the following specification, claims, and appended drawings.

DETAILED DESCRIPTION OF EMBODIMENTS

Figure 1:
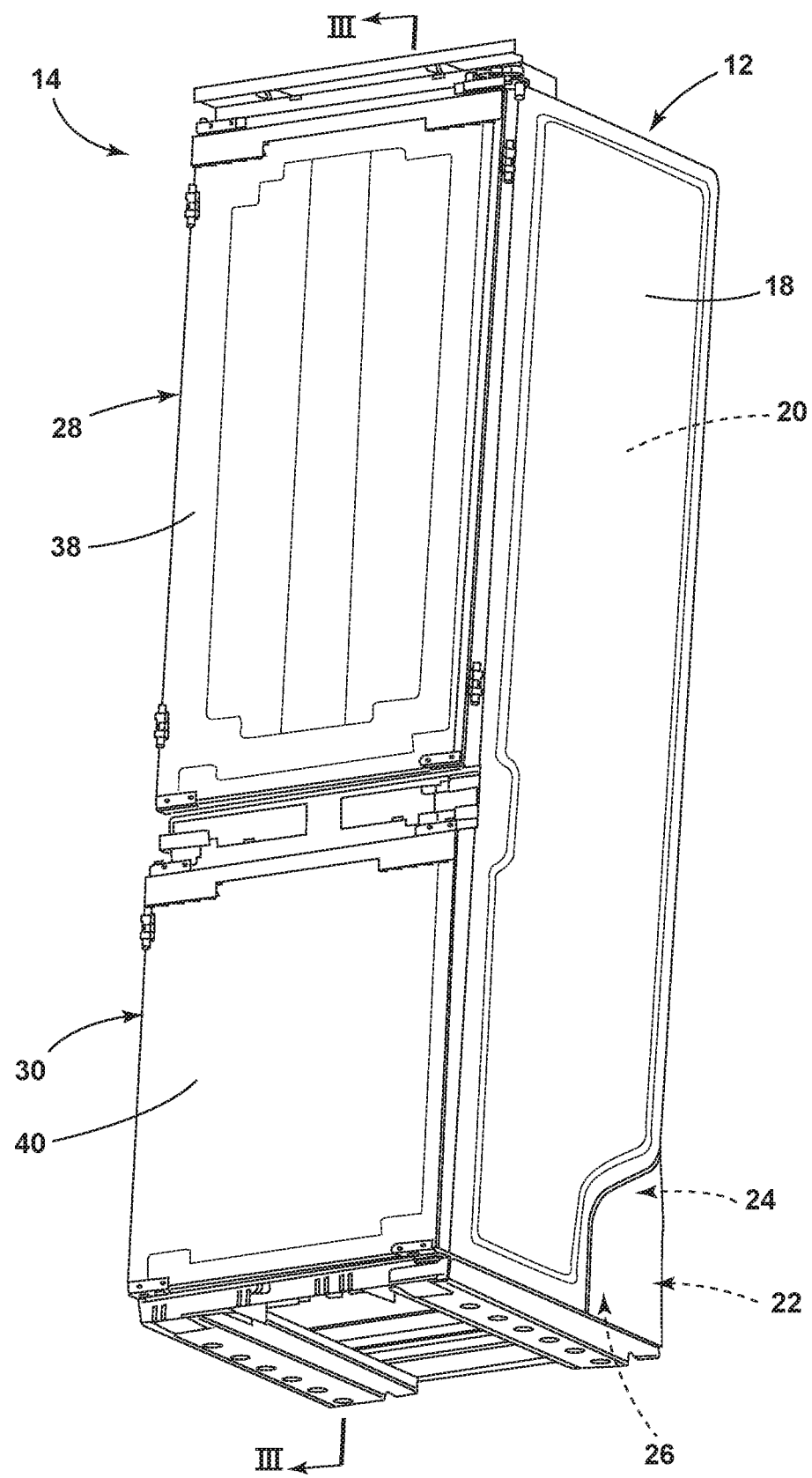
FIG. 1 is a front perspective view of an appliance cabinet incorporating an aspect of the ferromagnetic cover for a plastic trim breaker and showing door panels in closed positions.
Figure 2:
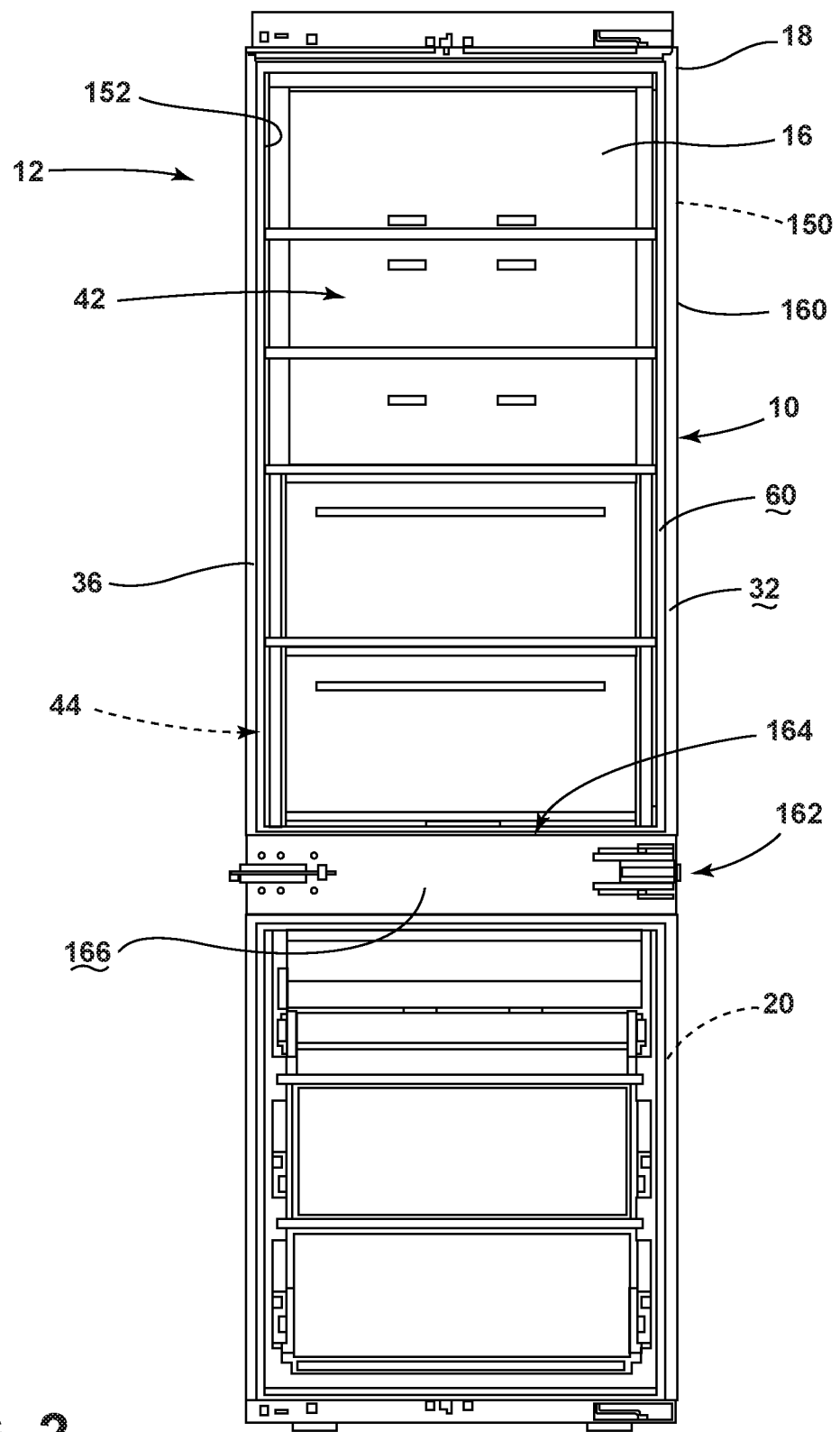
FIG. 2 is a front elevational view of the appliance cabinet of FIG. 1 showing the door panels removed.
Figure 3:
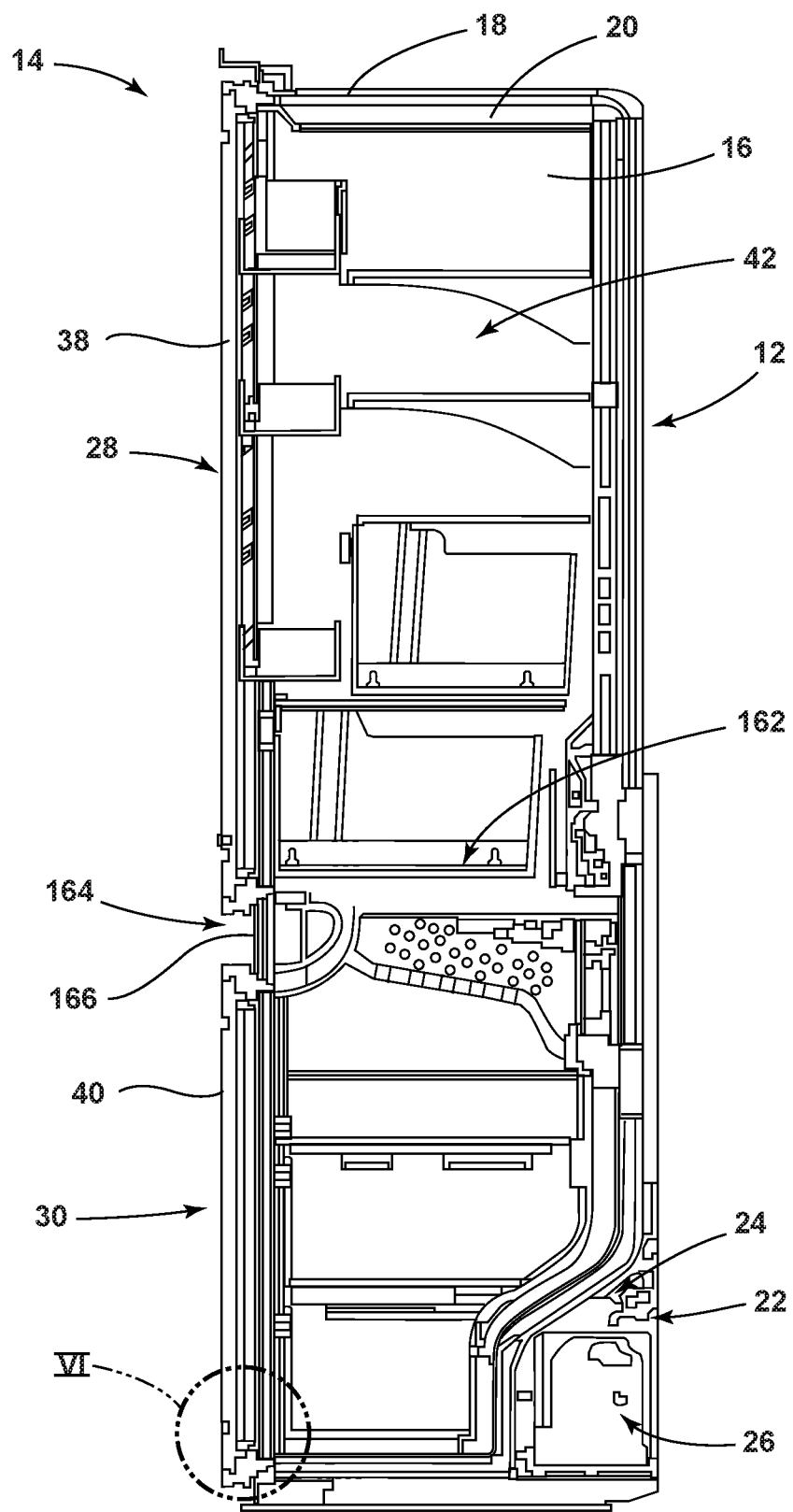
FIG. 3 is a cross-sectional view of the appliance cabinet of FIG. 1 taken along line III-III.
Figure 4:
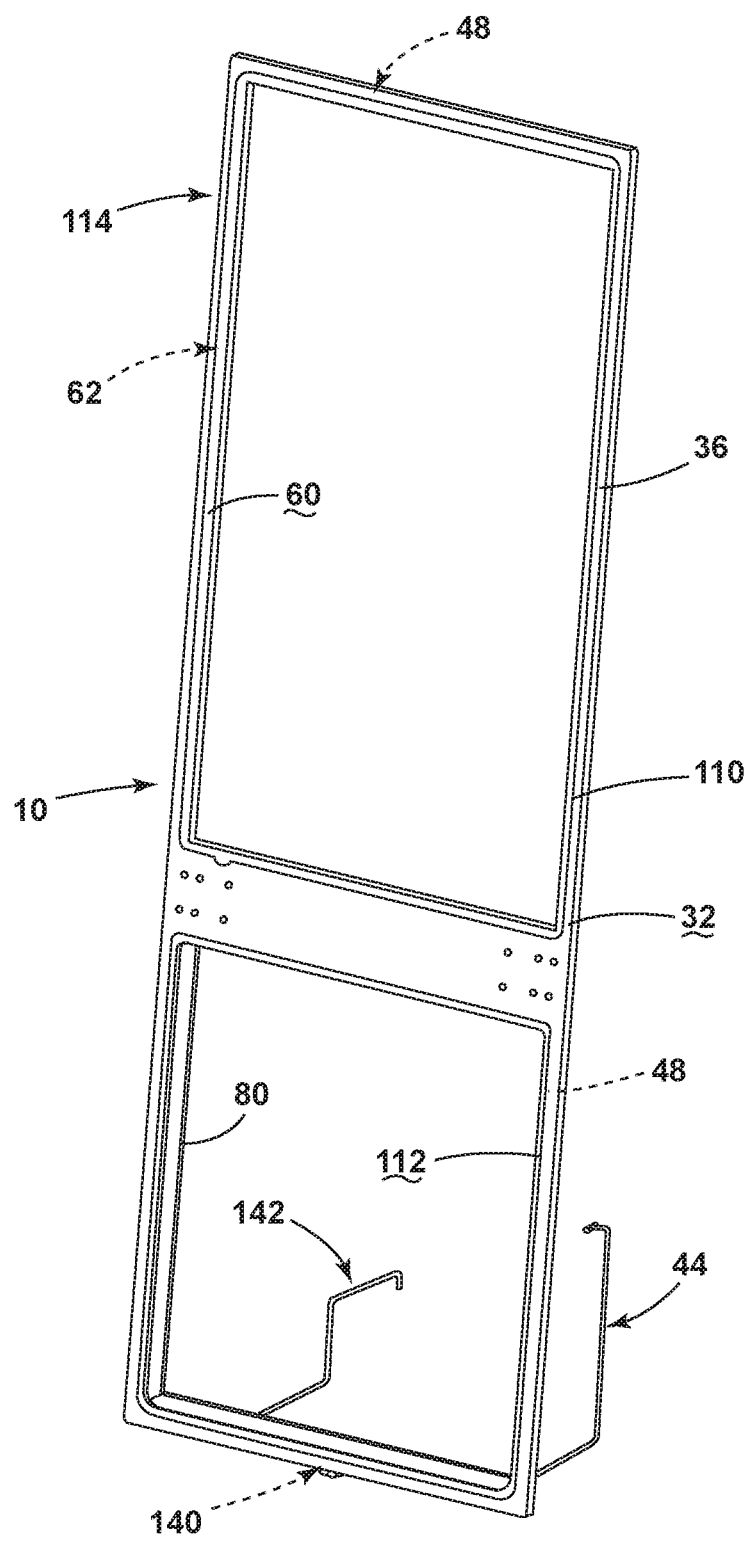
FIG. 4 is a front perspective view of a trim breaker for an appliance cabinet including a heat loop and an aspect of the ferromagnetic cover.
Figure 5:
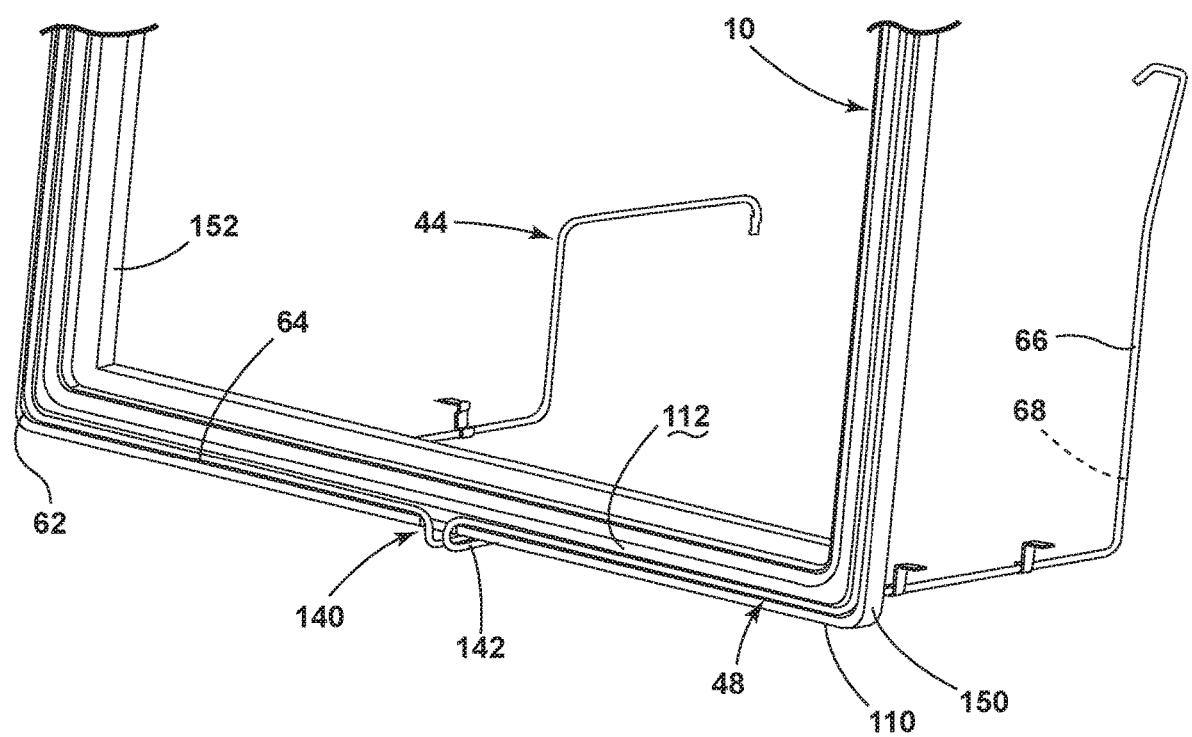
FIG. 5 is an enlarged perspective view of the trim breaker of FIG. 4 with the ferromagnetic cover removed.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-7, reference numeral 10 generally refers to a trim breaker that is incorporated within a cabinet 12 for an appliance 14 for attaching an inner liner 16 to an outer wrapper 18. The trim breaker 10 is typically a plastic member that couples the inner liner 16 and outer wrapper 18 together to form an insulating cavity 20 within the cabinet 12. According to various aspects of the device, the refrigerating appliance 14 can include the cabinet 12 having the inner liner 16, the outer wrapper 18 and the plastic trim breaker 10 extending therebetween. The cabinet 12 also includes a machine compartment 22. Typically, the machine compartment 22 is located proximate the outer wrapper 18 and includes various aspects of an electrical system 24 and a refrigeration system 26 for the appliance 14. In various aspects of the device, the outer wrapper 18 can define at least a portion of the machine compartment 22. The cabinet 12 includes a door panel 28 that is selectively operable relative to the cabinet 12 between an open position (not shown) and a closed position 30. The closed position 30 of the door panel 28 is defined by the door panel 28 engaging the contact surface 32 of the cabinet 12. The door panel 28 includes a magnetic seal 34 that magnetically engages the contact surface 32 to selectively define a closed position 30. As exemplified in FIGS. 1 and 3, the appliance 14 includes two door panels 28. Various appliances 14 incorporating an aspect of a ferromagnetic plate 36 for the trim breaker 10 can include a single door panel 28 or can include multiple door panels 28 that can include rotating doors 38 and sliding drawers 40 that can be used to access portions of the refrigerating interior 42 of the cabinet 12. A ferromagnetic plate 36 that is typically made of metal extends over a portion of the plastic trim breaker 10 to define the contact surface 32. A heat loop 44 is disposed between the trim breaker 10 and the ferromagnetic plate 36. The heat loop 44 is in thermal communication with the contact surface 32 and extends from the trim breaker 10 to the machine compartment 22. According to various aspects of the device, the ferromagnetic plate 36 includes a looped edge 46 that can define a heating chase 48. The heat loop 44 is positioned within the heating chase 48 that is defined by the looped edge 46. A portion of the heat loop 44 extends from the heating chase 48 to the machine compartment 22.

Referring again to FIGS. 3-7, the trim breaker 10 can include an external surface 60 that defines a recessed channel 62. In such an embodiment, the looped edge 46 of the ferromagnetic plate 36 extends at least partially into the recessed channel 62 to further define the heating chase 48. Additionally, where the looped edge 46 extends into the recessed channel 62, the heat loop 44 is also disposed within the recessed channel 62. In this manner, a contact-surface portion 64 of the heat loop 44 is typically disposed within the heating chase 48. The heat loop 44 can take the form of a tube member 66 that contains a fluid 68, such as a thermal-exchange material for delivering heat 70 to the contact surface 32. The heat loop 44 can also be in the form of a resistive heating element that can be activated to deliver heat 70 to the contact surface 32.

According to various aspects of the device, the heat loop 44 transfers heat 70 through the ferromagnetic plate 36 and to the contact surface 32. During operation of the appliance 14, cooling generated within the refrigerating interior 42 can migrate to exterior portions of the appliance 14, including the contact surface 32. If cooling reaches the contact surface 32, the air near the contact surface 32 can cool and form condensation. This condensation may accumulate upon portions of the contact surface 32. Condensation on the contact surface 32 can accumulate and present a visual and aesthetic nuisance to the user and can also result in pooling of condensation on the floor surrounding the appliance. By heating the contact surface 32 through use of the heat loop 44, the contact surface 32 remains approximately at or near the ambient temperature surrounding the appliance 14 to minimize the formation and accumulation of condensate within the contact surface 32.

Figure 6:
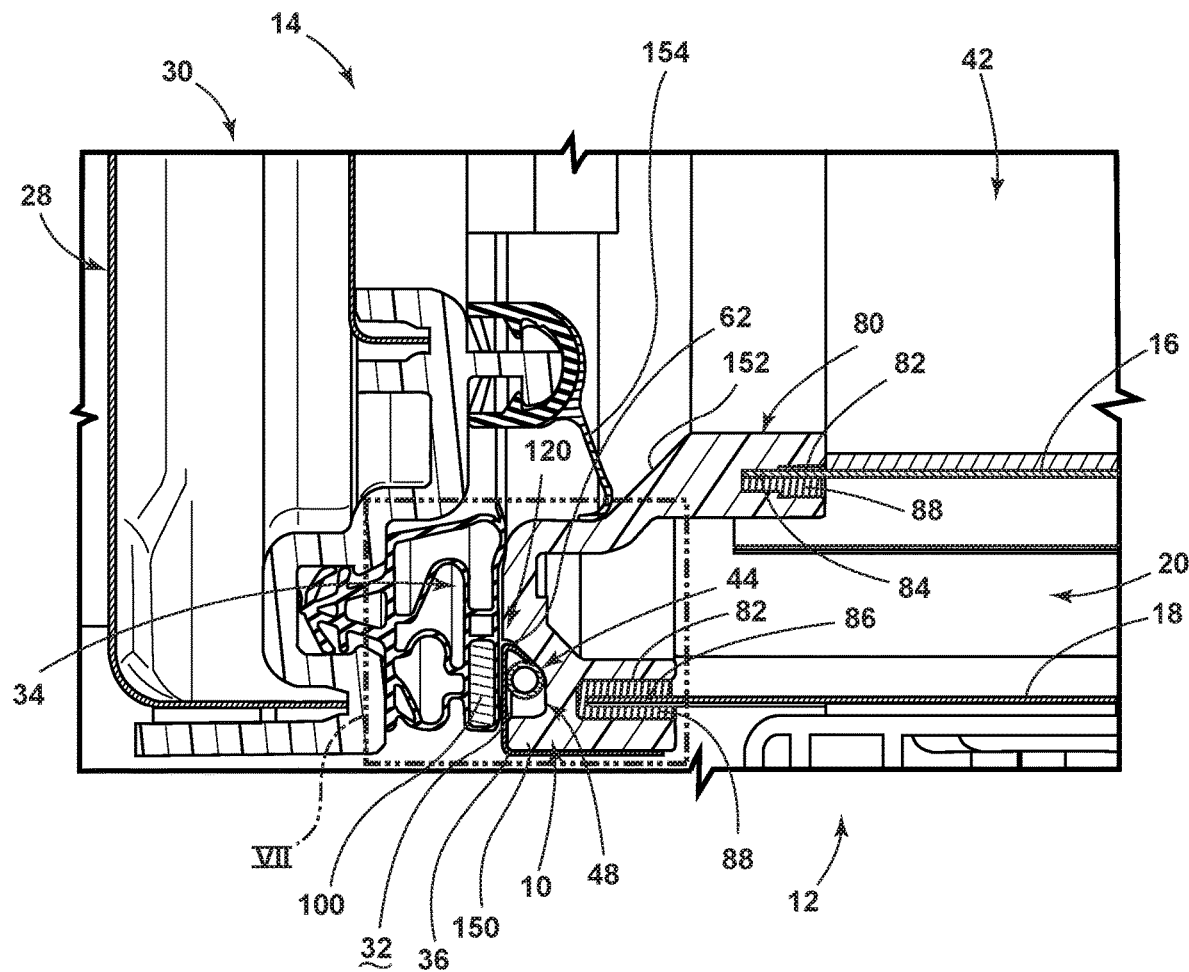
FIG. 6 is an enlarged cross-sectional view of the appliance cabinet of FIG. 3 taken at area VI.
Figure 7:
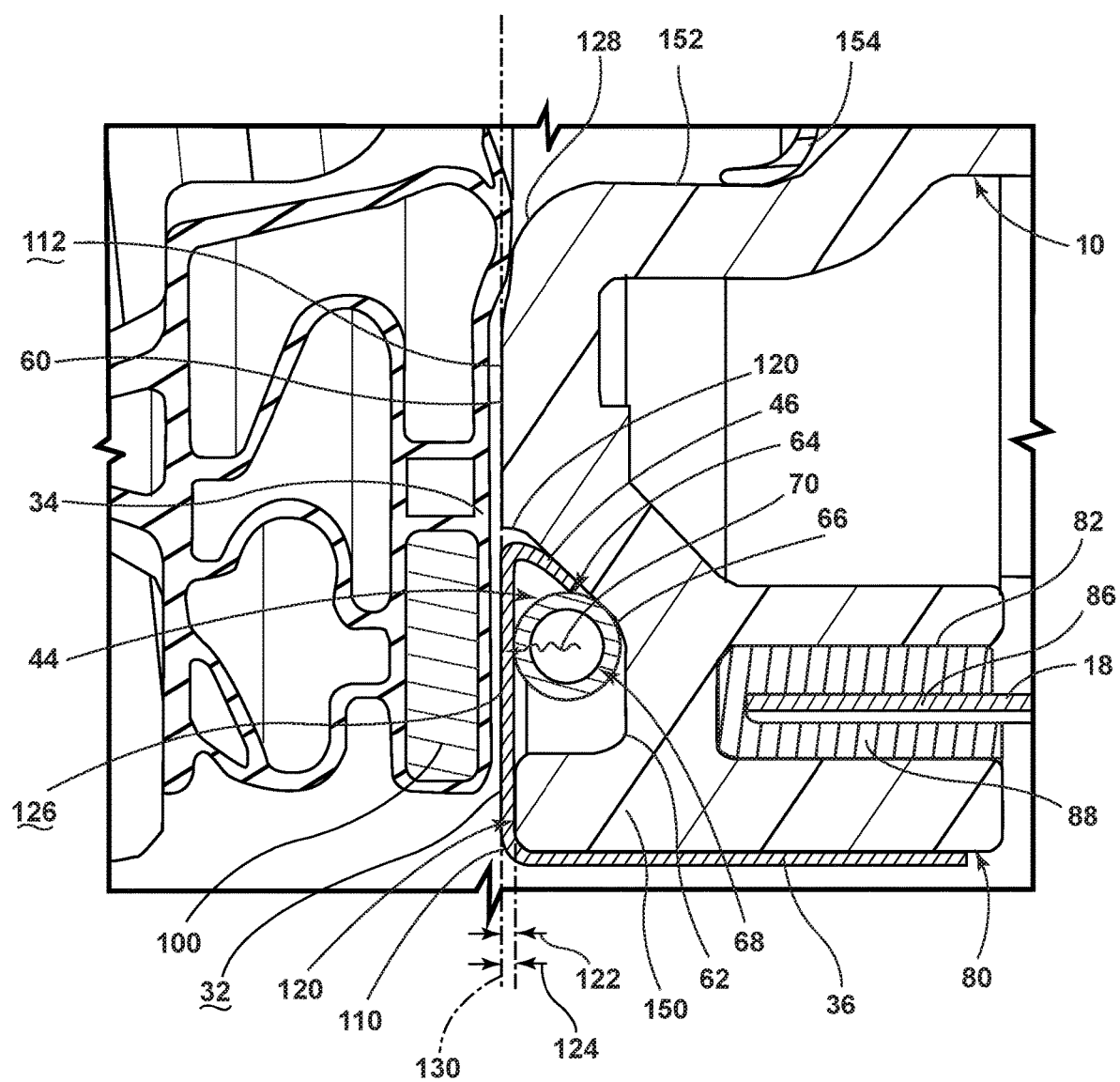
FIG. 7 is a further enlarged cross-sectional view of the appliance cabinet of FIG. 6.

Referring now to FIGS. 6 and 7, a rear portion 80 of the trim breaker 10 can include attachment recesses 82 that receive at least one of the inner liner 16 and the outer wrapper 18. These attachment recesses 82 of the trim breaker 10 serve to position the inner liner 16 and outer wrapper 18 distal from the contact surface 32. Accordingly, portions of the trim breaker 10 that are near the contact surface 32 are typically entirely made of plastic. The use of the plastic trim breaker 10 in connection with the attachment recesses 82 for receiving the inner liner 16 and the outer wrapper 18 allow for an efficient connection between the trim breaker 10 and the inner liner 16 and the outer wrapper 18. The plastic of the trim breaker 10 can also improve thermal performance of the appliance 14. At the trim breaker 10, a liner edge 84 of the inner liner 16 is typically in the form of a uniform and non-folded edge that can be inserted within one of the attachment recesses 82 of the trim breaker 10. Similarly, a wrapper edge 86 of the outer wrapper 18 is typically a substantially uniform wrapper edge 86 that is typically minimally folded, if at all. This wrapper edge 86 is inserted within one of the attachment recesses 82 of the trim breaker 10. Various adhesives 88 can be disposed within each of the attachment recesses 82 for adhering the inner liner 16 and the outer wrapper 18 to the trim breaker 10. Through the configuration of the inner liner 16 and outer wrapper 18 having substantially uniform and minimally folded edges, the process of forming the inner liner 16 and outer wrapper 18 and attaching the trim breaker 10 to the inner liner 16 and outer wrapper 18 is an efficient and convenient operation.

Within conventional appliances, the metallic wrapper can include a complex folded edge that can be in the form of a triple-flange feature of the metallic wrapper. This complex folded edge of the metallic wrapper increases the complexity of the attachment between the liner and the metallic wrapper and also greatly increases the time and resources spent on forming the metallic wrapper and the cabinet for the appliance as a whole.

As exemplified in FIGS. 6 and 7, the inner liner 16 and outer wrapper 18 are substantially straight-edged formations that can be conveniently inserted into the attachment recesses 82 of the trim breaker 10 and adhered within these attachment recesses 82 to form the cabinet 12 for the appliance 14.

Referring again to FIGS. 4-7, the appliance 14 includes the cabinet 12 that includes the inner liner 16 and the outer wrapper 18 and the plastic trim breaker 10 that extends therebetween. The door panel 28 is selectively operable relative to the cabinet 12 between the open position and the closed position 30. The closed position 30 is defined by the door panel 28 engaging the contact surface 32 of the cabinet 12. The door panel 28 includes a seal 34 with a magnetic member 100 disposed within the seal 34. A ferromagnetic plate 36 extends over a portion of the plastic trim breaker 10 to define the contact surface 32. The magnetic member 100 of the seal 34 for the door panel 28 magnetically engages the ferromagnetic plate 36 to selectively retain the seal 34 against the contact surface 32 to define the closed position 30 of the door panel 28. The heat loop 44 is typically disposed between the trim breaker 10 and the ferromagnetic plate 36. In this manner, the heat loop 44 is in thermal communication with the contact surface 32. As discussed above, the heat loop 44 extends from the trim breaker 10 to the machine compartment 22.

As exemplified in FIGS. 4-7, the ferromagnetic plate 36 can include a substantially L-shaped member that extends over an outer edge 110 of the trim breaker 10 and also over at least a portion of the edge surface 112 of the trim breaker 10. As discussed above, the ferromagnetic plate 36 can include a looped edge 46 that extends at least partially around a portion of the heat loop 44. This looped edge 46 can take the form of an inwardly bent edge of the ferromagnetic plate 36 that extends adjacent to the heat loop 44 within the recessed channel 62 of the trim breaker 10. In other aspects of the device, the ferromagnetic plate 36 can extend around and at least partially behind a portion of the heat loop 44. In such an embodiment, the heat loop 44 and the ferromagnetic plate 36 can be assembled as a unit in the form of a contact-surface assembly 114. This contact-surface assembly 114 can be used to define the contact-surface assembly 114 and can be installed as a unit onto the trim breaker 10 after the trim breaker 10 has been attached to the inner liner 16 and the outer wrapper 18 and secured thereto, as discussed above. By using the contact-surface assembly 114, the ferromagnetic plate 36 and the heat loop 44 can be formed as a single unit and then installed as a single unit onto the remainder of the cabinet 12 for the appliance 14.

This process can improve the efficiency of manufacture for the cabinet 12 of the appliance 14.

Referring again to FIGS. 3-7, the ferromagnetic plate 36 extends over the recessed channel 62 of the trim breaker 10 to at least partially conceal the heat loop 44. Portions of the trim breaker 10 can be visible in an area adjacent to the contact surface 32. In such an embodiment, the contact surface 32 may extend forward of the remainder of the trim breaker 10. It is also contemplated that the trim breaker 10 can include an offset 120 that receives the ferromagnetic plate 36. This offset 120 generally includes a width 122 that is substantially similar to the thickness 124 of the ferromagnetic plate 36. When the ferromagnetic plate 36 is disposed within the offset 120, the outer surface 126 of the ferromagnetic plate 36 and an exposed portion 128 of the edge surface 112 of the trim breaker 10 define a common or substantially common vertical plane 130. It is contemplated that this common vertical plane 130 can also define the contact surface 32 for the cabinet 12 of the appliance 14. In such a configuration, the contact surface 32 can be specifically positioned within an area to receive the magnetic member 100 of the seal 34 for the appliance door panel 28. Accordingly, the transfer of heat 70 from the heat loop 44 to the contact surface 32 can be concentrated to a very specific area that requires heat 70 to minimize and/or eliminate condensate from forming on the contact surface 32.

Referring again to FIGS. 4 and 5, the recessed channel 62 of the trim breaker 10 can include an outlet notch 140. The outlet notch 140 receives an outlet portion 142 of the heat loop 44. This outlet portion 142 of the heat loop 44 extends from the trim breaker 10 and toward the machine compartment 22. The outlet notch 140 can be in the form of an extension of the recessed channel 62 that extends substantially perpendicular to the adjacent portion of the recessed channel 62. The outlet notch 140 can extend around at least a portion of the trim breaker 10 to allow for passage of the heat loop 44 around the trim breaker 10 while remaining concealed or otherwise covered by the ferromagnetic plate 36. Accordingly, the outlet notch 140 of the recessed channel 62 for the trim breaker 10 allows for the placement of the heat loop 44 to extend from the contact surface 32 of the trim breaker 10, around a portion of the trim breaker 10, and to the machine compartment 22 that is typically located toward the rear of the cabinet 12 for the appliance 14. Typically, the outlet notch 140 is located at a bottom portion of the trim breaker 10 to minimize the run of the heat loop 44 from the trim breaker 10 to the machine compartment 22.

In the machine compartment 22, the heat loop 44 is coupled with an aspect of the electrical system 24 and/or refrigeration system 26 of the appliance 14. The electrical system 24 and/or refrigeration system 26 of the appliance 14 can activate the heat loop 44 to deliver heat 70 to the contact surface 32 of the cabinet 12. This heat 70 can be delivered through the heat loop 44 by running an electrical current through an electrically resistive heating element. This heat 70 can also be transferred to the contact surface 32 by delivering a heated fluid 68 through the heat loop 44, such as by pumping the heated fluid 68 therethrough. As this heated fluid 68 passes the contact surface 32, this heated fluid 68 allows for the transfer of heat 70 from the heat loop 44, through the ferromagnetic plate 36 and to the contact surface 32. This heated fluid 68 can be in the form of a refrigerant, water, brine, combinations thereof, and other similar heat-exchange materials that can be heated and pumped through a tubular heat loop 44.

Referring again to FIGS. 6 and 7, the ferromagnetic plate 36 can be an angled member that extends over a portion of the edge surface 112 for the trim breaker 10 and is typically attached by an adhesive 88. The angled portion of the ferromagnetic plate 36 can extend over a wrapper-side of the external surface 60 for the trim breaker 10 that is typically toward an outside of the cabinet 12 for the appliance 14. Through this configuration, the trim breaker 10 can be used to cover the outlet notch 140 for the recessed channel 62 from the trim breaker 10. Additionally, the ferromagnetic plate 36 is configured to primarily cover a portion of the edge surface 112 of the trim breaker 10. By covering primarily a wrapper-side portion 150 of the trim breaker 10, the liner-side portion 152 of the trim breaker 10 can include the exposed portion 128 of the trim breaker 10. This exposed portion 128 of the plastic trim breaker 10 may have better thermal insulating properties that can be used to engage various gaskets 154 of the door panel 28 for the appliance 14. This engagement between the various gaskets 154 and the plastic liner-side portion 152 of the trim breaker 10 can be used to minimize thermal transfer from areas within the refrigerating interior 42 of the cabinet 12 and through the engagement between the door panel 28 and the trim breaker 10. Because the ferromagnetic plate 36 may be a good conductor of heat 70, the positioning of the ferromagnetic plate 36 and the contact surface 32 is limited to the upper-side portion to maximize the selected engagement between the magnetic member 100 of the seal 34 for the door panel 28 and the trim breaker 10. The exposed portions 128 of the plastic material of the trim breaker 10 are also utilized to increase the insulating capability of the engagement between the door panel 28 and the trim breaker 10. By placing the ferromagnetic metal plate 36 at portions of the outside areas of the cabinet 12, heat 70 can be transferred through the ferromagnetic plate 36 from the heat loop 44 to prevent condensation from forming at the contact surface 32 and other areas of the ferromagnetic metal plate 36 that are distal from the contact surface 32.

Typically, the ferromagnetic plate 36 can be made of various magnetic materials that can include, but are not limited to, ferromagnetic metals, and other ferrous materials that can conduct heat and also attract the magnet member of the seal 34 for the door panel 28. Typically, where the ferromagnetic plate 36 is metallic, such metals can include, but are not limited to, ferrous stainless steel, iron, steel alloys and other heat conductive and magnetic metals. The ferromagnetic plate 36 can also include non-metallic ferromagnetic and magnetic materials that can include, but are not limited to, permanent magnets, rare-earth magnets, plastic magnets, ceramic magnets, composite magnets, combinations thereof, and other similar magnetic and ferromagnetic materials.

According to various aspects of the device, the inner liner 16 and the outer wrapper 18 can be made of the various materials that can include, but are not limited to, metal, plastic, various polymers, combinations thereof and other similar materials. Typically, the inner liner 16 and outer wrapper 18 will be made of a metallic material.

As exemplified in FIGS. 1-2 and 4-5, the heat loop 44 can extend around an outer perimeter 160 of the cabinet 12 and can also extend through medial portions 162 of the cabinet 12. Typically, a single continuous heat loop 44 will extend around the trim breaker 10 to provide heat 70 to substantially the entire contact surface 32 of the cabinet 12. Similarly, the ferromagnetic plate 36 can extend around the outer perimeter 160 of the cabinet 12 as well as through the exterior surface of interior mullions 164 for the cabinet 12. As exemplified in FIG. 4, where an interior mullion 164 is implemented, the ferromagnetic plate 36 may include a substantially planar sheet that extends across the face 166 of the interior mullion 164. As discussed above, the ferromagnetic plate 36 is a good conductor of heat 70 and is advantageous for use as part of the heat loop 44 assembly. To minimize the transfer of heat 70 to the liner-side portion 152 of the trim breaker 10, the ferromagnetic plate 36 is offset 120 from the liner-side portion 152 of the external surface 60 of the trim breaker 10 to allow for engagement of the various gaskets 154 and thermal breakers that may be included within the door panels 28 for the appliance 14. As discussed above, the engagement between the various gaskets 154 of the door panels 28 and the plastic material of the trim breaker 10 provides better thermal performance at minimizing the transfer of heat 70 from within the refrigerating interior 42 of an appliance 14 to areas external to the appliance 14 and vice versa.

By placing the ferromagnetic plate 36 at the edge surface 112 of the trim breaker 10 and also around the outside, or wrapper-side portion 150, of the trim breaker 10, the ferromagnetic plate 36 also provides a robust exposed surface for protecting a trim breaker 10 from wear and tear during manufacture, delivery and use of the cabinet 12 for the appliance 14.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width 122 of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A refrigerating appliance comprising:
    a cabinet having an inner liner, an outer wrapper and a plastic trim breaker extending therebetween, the cabinet defining a machine compartment;
    a door panel that is selectively operable relative to the cabinet between open and closed positions, the door panel having a magnetic seal that magnetically engages a contact surface of the cabinet to selectively define the closed position of the door panel;
    a ferromagnetic plate that extends over a portion of the plastic trim breaker to define the contact surface; and
    a heat loop disposed between the plastic trim breaker and the ferromagnetic plate and in thermal communication with the contact surface, wherein the heat loop extends from the plastic trim breaker to the machine compartment, wherein the ferromagnetic plate includes a looped edge that defines a heating chase, and wherein the heat loop is positioned within the heating chase defined by the looped edge, and wherein a portion of the heat loop extends from the heating chase to the machine compartment, wherein the plastic trim breaker includes an external surface that defines a recessed channel, wherein the looped edge extends into the recessed channel to further define the heating chase.

2. The refrigerating appliance of claim 1, wherein the heat loop includes a tube member that contains a fluid for delivering heat to the contact surface.

3. The refrigerating appliance of claim 1, wherein a contact-surface portion of the heat loop is disposed within the heating chase.

4. The refrigerating appliance of claim 3, wherein the recessed channel includes an outlet notch that receives an outlet portion of the heat loop, wherein the outlet portion of the heat loop extends from the trim breaker toward the machine compartment.

5. The refrigerating appliance of claim 1, wherein a rear portion of the plastic trim breaker includes attachment recesses that receive at least one of the inner liner and the outer wrapper, and wherein the attachment recesses position the inner liner and the outer wrapper distal from the contact surface.

6. A refrigerating appliance comprising:
- a cabinet having an inner liner, an outer wrapper and a plastic trim breaker extending therebetween, the cabinet defining a machine compartment;
- a door panel that is selectively operable relative to the cabinet between open and closed positions, the closed position defined by a seal of the door panel engaging a contact surface of the cabinet, the seal having a magnetic member disposed within the seal;
- a ferromagnetic plate that extends over a portion of the plastic trim breaker to define the contact surface, wherein the magnetic member magnetically engages the ferromagnetic plate to selectively retain the seal against the contact surface to define the closed position; and
- a heat loop disposed between the plastic breaker and the ferromagnetic plate and in thermal communication with the contact surface, wherein the heat loop extends from the plastic trim breaker to the machine compartment, wherein the plastic trim breaker includes a recessed channel defined within an edge surface of the plastic trim breaker and the heat loop is positioned within the recessed channel wherein the ferromagnetic plate includes a looped edge that extends at least partially into the recessed channel.

7. The refrigerating appliance of claim 6, wherein the heat loop includes a tube member that contains a fluid for delivering heat to the contact surface.

8. The refrigerating appliance of claim 6, wherein the ferromagnetic plate extends over the recessed channel to at least partially conceal the heat loop.

9. The refrigerating appliance of claim 6, wherein a contact-surface portion of the heat loop is disposed within the looped edge.

10. The refrigerating appliance of claim 9, wherein the recessed channel includes an outlet notch that receives an outlet portion of the heat loop, wherein the outlet portion of the heat loop extends from the plastic trim breaker toward the machine compartment.

11. The refrigerating appliance of claim 6, wherein the heat loop includes a resistive heating element.

12. The refrigerating appliance of claim 6, wherein a rear portion of the plastic trim breaker includes attachment recesses that receive at least one of the inner liner and the outer wrapper, and wherein the attachment recesses position the inner liner and the outer wrapper distal from the contact surface.

13. The refrigerating appliance of claim 6, wherein the ferromagnetic plate is attached to the plastic trim breaker by an adhesive.

14. The refrigerating appliance of claim 6, wherein the plastic trim breaker includes an offset that receives the ferromagnetic plate, wherein an outer surface of the ferromagnetic plate and an external surface of the plastic trim breaker define a common vertical plane, and wherein the contact surface is defined within the common vertical plane.

15. A refrigerating appliance comprising:
- an inner liner;
- an outer wrapper;
- a plastic trim breaker extending between the inner liner and the outer wrapper and defining a contact surface;
- a door panel having a magnetic seal, the door panel being selectively operable relative to the contact surface between open and closed positions, the closed position defined by the magnetic seal of the door panel selectively engaging the contact surface;
- a ferromagnetic plate that extends over a portion of the plastic trim breaker to define the contact surface, wherein the magnetic seal magnetically engages the ferromagnetic plate to selectively retain the magnetic seal against the contact surface to define the closed position; and
- a heat loop disposed between the plastic trim breaker and the ferromagnetic plate and in thermal communication with the contact surface, wherein the heat loop extends from the plastic trim breaker to a machine compartment, wherein the ferromagnetic plate includes a looped edge that at least partially defines a heating chase, wherein a portion of the heat loop is disposed within the heating chase, wherein the plastic trim breaker includes an external surface that defines a recessed channel, wherein the looped edge extends into the recessed channel to further define the heating chase.

16. The refrigerating appliance of claim 15, wherein the recessed channel includes an outlet notch that receives an outlet portion of the heat loop, wherein the outlet portion of the heat loop extends from the plastic trim breaker toward the machine compartment that is at least partially defined by the outer wrapper.

* * * * *